United States Patent [19]

Ibaraki et al.

[11] Patent Number: 4,722,008
[45] Date of Patent: Jan. 26, 1988

[54] HALFTONE PICTURE PROCESSING APPARATUS

[75] Inventors: Hisashi Ibaraki; Makoto Kobayashi; Hiroshi Ochi, all of Kanagawa, Japan

[73] Assignee: Nippon Telegraph & Telephone Corporation, Japan

[21] Appl. No.: 817,046

[22] Filed: Jan. 8, 1986

[30] Foreign Application Priority Data

Jan. 10, 1985 [JP] Japan .................................. 60-2453
Feb. 23, 1985 [JP] Japan .................................. 60-33696
Apr. 15, 1985 [JP] Japan .................................. 60-79874
Dec. 23, 1985 [JP] Japan .................................. 60-287696

[51] Int. Cl.$^4$ ............................................. H04N 1/40
[52] U.S. Cl. ..................................... 358/283; 358/282
[58] Field of Search ............... 358/260, 261, 280, 282, 358/283

[56] References Cited

U.S. PATENT DOCUMENTS 4,254,438 3/1981 Yamazaki et al. .................. 358/280
4,577,235 3/1986 Kannapell et al. .................. 358/280

Primary Examiner—Edward L. Coles, Sr.
Attorney, Agent, or Firm—Roberts, Spiecens & Cohen

[57] ABSTRACT

A halftone picture processing apparatus has devices for dividing and storing an image signal in the form of blocks each of which consists of a plurality of pixels, for setting at least one path for accessing the pixels in each block, calculating the number of changes in image signals which satisfies predetermined conditions, the changes occurring between succeeding pixels in each block along the path, and detecting a halftone region in accordance with the number of changes in image signals.

22 Claims, 20 Drawing Figures

FIG. 5

| 1  | 4  | 5  | 8  |
|----|----|----|----|
| 2  | 3  | 6  | 7  |
| 9  | 12 | 13 | 16 |
| 10 | 11 | 14 | 15 |

FIG. 6

| j \ i | 1 | 2  | 3  | 4  |
|-------|---|----|----|----|
| 1     | 0 | 3  | 4  | 7  |
| 2     | 1 | 3  | 5  | 6  |
| 3     | 9 | 10 | 13 | 14 |
| 4     | 8 | 11 | 12 | 15 |

FIG. 8

ACCESS ORDER ALONG
HORIZONTAL SCANNING DIRECTION

| 1 | 2 | 3 | 4 |
|---|---|---|---|
| 5 | 6 | 7 | 8 |
| 9 | 10 | 11 | 12 |
| 13 | 14 | 15 | 16 |

ACCESS ORDER ALONG
VERTICAL SCANNING DIRECTION

| 1 | 5 | 9 | 13 |
|---|---|---|---|
| 2 | 6 | 10 | 14 |
| 3 | 7 | 11 | 15 |
| 4 | 8 | 12 | 16 |

FIG. 9

| j \ i | 1 | 2 | 3 | 4 |
|---|---|---|---|---|
| 1 | [0,0] | [4,0] | [8,0] | [12,0] |
| 2 | [0,4] | [4,4] | [8,4] | [12,4] |
| 3 | [0,8] | [4,8] | [8,8] | [12,8] |
| 4 | [0,12] | [4,12] | [8,12] | [12,12] |

FIG. 10

| 1 | 2 | 3 | 4 |
|---|---|---|---|
| 12 | 13 | 16 | 5 |
| 11 | 14 | 15 | 6 |
| 10 | 9 | 8 | 7 |

FIG. 11

| j \ i | 1 | 2 | 3 | 4 |
|---|---|---|---|---|
| 1 | [0,0] | [3,0] | [5,0] | [8,0] |
| 2 | [0,4] | [3,4] | [5,4] | [8,4] |
| 3 | [0,3] | [3,3] | [5,3] | [8,3] |
| 4 | [0,7] | [3,7] | [5,7] | [8,7] |

FIG. 16

|  |  |  |
|---|---|---|
|  | PB = 5 |  |
| PA = 12 | P0 = 6 |  |

FIG. 17

| 120 | 140 | 140 | 120 |
|---|---|---|---|
| 120 | 100 | 120 | 50 |
| 100 | 40 | 50 | 40 |
| 40 | 40 | 30 | 30 |

$P_1 = 40$
$P_2 = 120$ →

| 120 | 120 | 120 | 120 |
|---|---|---|---|
| 120 | 120 | 120 | 40 |
| 120 | 40 | 40 | 40 |
| 40 | 40 | 40 | 40 |

HALFTONE PICTURE PROCESSING APPARATUS

BACKGROUND OF THE INVENTION

1. Field of the Invention

The present invention relates to a halftone picture processing apparatus for automatically detecting a halftone region in an image signal obtained upon scanning an original such as a halftone picture containing an image area the density of which is represented by dot size.

2. Brief Description of the Prior Arts

Most general gray scale or color images provide printouts utilizing halftone pictures. In general, halftone pictures are used in the field of printing to express the density of an original. By using different sized dots, a continuous-tone picture can be represented by a halftone picture. Halftone pictures are thus used for most printouts. Ink dot patterns vary from fine to rough. When a continuous-tone picture is scanned by a facsimile system, the period of gradation level changes is large enough as compared with the sampling period so that the change in gradation between adjacent pixels is small. However, a halftone picture is constituted by an aggregate of small black dots, the density of which is substantially the same as the sampling period. For this reason, the gradation abruptly changes from pixel to pixel. When a halftone picture is transmitted by a facsimile system or the like, or is encoded and stored as an image file in a memory, existing coding schemes assume that gradation changes are the same as in continuous-tone pictures As a result, the conventional coding schemes are not suitable for halftone pictures and greatly impair coding efficiency.

When a gray scale picture is accessed at a binary terminal, a halftone picture is represented by a white and black representation (so-called dithered picture). In this case, moire noise degrades image quality. Furthermore, an original may include halftone, continuous-tone and document regions mixed together. In order to prevent the above problem, halftone regions in the original must be detected, and the same processing as for continuous-tone pictures must be performed for the halftone picture after variations caused by screen pattern are eliminated from the image signal. As a result, halftone detection is absolutely necessary. A halftone screen frequency is 65 to 200 lines/inch. If a scanner frequency of facsimile is given as 8 dots/mm, the ratio of screen to halftone frequency varies from 4.4 to 1.4. An effective halftone detection method is thus required for different halftone screen frequencies.

The following three conventional halftone detection schemes are currently available:

(1) Half Screen Frequency Detection Scheme

An image is transformed to coordinates in an orthogonal coordinate system, and the coordinates are plotted along the spatial frequency axis to provide different features in accordance with different images. When the halftone picture is converted and plotted in the orthogonal coordinate system, the halftone region can be detected since the halftone picture has a component of halftone screen frequency in the high-frequency region. This conventional scheme, however, requires many reference pixels to obtain sufficient data for detection.

(2) Scheme for Comparing Input Signal with Reference Halftone Screen Pattern

Signals representing characteristic screen patterns are stored in a memory or the like. An input signal is compared with the stored screen patterns. A halftone region is detected in a portion where the input signals frequently coincide with the screen patterns. This conventional scheme requires a large memory capacity, and the screen patterns must be known in advance, thus impairing versatility.

(3) Level Distribution Type Detection Scheme

Halftone pictures are obtained by spatially modulating a continuous-tone picture with black dots. Thus, the occurrence frequency of pixels with high or low densities is very high, and the occurrence frequency of pixels with intermediate densities is very low. According to this conventional scheme, level distribution characteristics are utilized to detect halftone regions. This conventional scheme, however, requires many pixels to obtain sufficient data for detection.

According to another conventional scheme, image signals which do not contain halftone regions, such as character portions and photographs, are divided into an abrupt level change portion, including edges and characters, and a moderate level change portion, excluding edges and characters. Averaging of the image signal is then performed. In this manner, redundancy is eliminated without impairing precision. However, due to quick changes in signal levels of the halftone regions described above, this scheme cannot detect edges or sufficiently eliminate redundancy in averaging without impairing precision for an image signal including halftone regions.

SUMMARY OF THE INVENTION

It is an object of the present invention to provide a halftone picture processing apparatus wherein the numerous and complex operations required by a conventional halftone picture processing apparatus for detecting a halftone region in an image signal can be reduced and simplified, and the halftone region can be sequentially detected in a real time manner with a small memory capacity and simple processing.

It is another object of the present invention to provide a halftone picture processing apparatus for detecting a halftone region with high precision even if the halftone screen frequency varies.

It is still another object of the present invention to provide a halftone picture processing apparatus for converting a detected halftone region to a continuous-tone signal suitable for coding without impairing precision.

In order to achieve the above and other objects of the present invention, there is provided a halftone picture processing apparatus for scanning an original that may contain a halftone picture, obtaining a gray scale image signal, dividing the gray scale image signal into blocks each of which has a plurality of pixels, and processing the blocks, comprising: means for storing blocks each of which has a plurality of pixels; means for sequentially reading out pixel signals in units of blocks in accordance with at least one predetermined access path; change count detecting means for detecting a change in signal level between succeeding pixel signals read out along the access path and counting the number of times changes occur in signal levels; and means for discriminating in accordance with the number of changes whether or not a block corresponding to the change in signal level is a halftone region.

According to an aspect of the present invention, two access paths are provided, the first extending along the horizontal scanning direction of the blocks, and the second extending along the vertical scanning direction thereof.

According to another aspect of the present invention, there is provided change count detecting means having means for sequentially detecting differences between signal levels of succeeding pixel signals along the access path, and means for counting the number of times changes occur in signal level from positive to negative and from negative to positive.

According to still another aspect of the present invention, there is provided change count detecting means having means for discriminating whether or not each pixel signal has a level higher than a predetermined level or a signal level (e.g., an average signal level of each block) derived from the pixel signals, and means for counting the number of changes occur between the succeeding pixel signals along the access path. According to this change count detecting means, since a change is detected by a comparison between each pixel signal and the predetermined level, this means is substantially free from image signal noise or the like.

According to still another aspect of the present invention, there is provided change count detecting means having means for sequentially calculating differences between signal levels of succeeding pixel signals, means for detecting as significant only differences larger than a predetermined value, and means for counting the number of times positive and negative changes occur between succeeding pixel signals along the access path. A similar change count detecting means has means for calculating a difference between each pixel signal and a predetermined signal level, means for detecting as significant only differences larger than a predetermined value, and means for counting the number of times positive and negative changes occur between succeeding pixel signals along the access path. According to this change count detecting means, only large changes in signal levels are detected, so that the change count detecting means is substantially free from image signal noise. At the same time, the discrimination precision of halftone regions, which are portions with a large amplitude change, can be improved.

When two access paths are provided in a halftone picture processing apparatus, the halftone region discriminating means has means for comparing predetermined values with the numbers of times changes occur in signal levels along the first and second access paths, wherein a block corresponding to comparison results representing that the numbers of changes are respectively larger than the predetermined values is discriminated as a halftone region, and a signal representing that the block is a halftone region is generated.

According to still another aspect of the present invention, each halftone picture processing apparatus described above further has means for calculating a difference between the maximum and minimum signal levels of pixels in the block and comparing means for comparing the difference with a predetermined value and discriminating that the block is not a halftone region when the difference between the maximum and minimum signal levels is smaller than a predetermined value. With this arrangement, blocks are not erroneously discriminated as halftone regions when noise is mixed in with the blank area of a document or the background portion of a continuous-tone picture. Therefore, halftone regions can be detected with high precision.

According to still another aspect of the present invention, each halftone picture processing apparatus described above further comprises means for calculating an average signal level of each block, means for calculating a difference between the average signal levels of adjacent blocks, edge discriminating means for comparing the difference with a predetermined value and discriminating an edge when the difference is larger than the predetermined value, and edge processing means for replacing the pixels in the block determined to be an edge with several signal levels, the differences between which are large. With this arrangement, characters and normal image edges can be properly processed, and the screen pattern can be eliminated while edges of the edge portion of the halftone picture can be kept distinct.

The apparatus of the present invention can detect a halftone region with a small number of reference pixels and can achieve sequential operation as compared with a conventional halftone detection apparatus. For example, conventional detection using orthogonal transformation requires about $64 \times 64$ pixels, whereas the present invention requires only about $4 \times 4$ pixels.

In addition, since the present invention utilizes a density change caused by screen pattern in halftone detection, only a few dots are required in a reference pixel to detect the halftone region. For this reason, the present invention provides high-precision detection for halftone pictures with different halftone screen frequencies.

Furthermore, since the present invention can provide high-precision detection for each small area, a mixture of a halftone picture and characters in an original does not cause substantial discrimination errors at the boundaries of the different regions. Therefore, smoothing is not erroneously performed for character regions, and image quality does not suffer.

The foregoing and other objects, features and advantages of the invention will be apparent from the following more particular description of an illustrated embodiment of the invention, as illustrated in the accompanying drawings.

BRIEF DESCRIPTION OF THE DRAWINGS

FIG. 5 is a representation showing another intrablock read access order;

FIG. 6 is a table showing the number of times density changes occur in FIG. 2 when density changes are processed in the order shown in FIG. 5;

FIG. 8 is a representation showing an intrablock read access orders when two access paths are used;

FIG. 9 is a table showing the number of times density changes occur in FIG. 2 when density changes are processed in accordance with the access paths shown in FIG. 8;

FIG. 10 is a representation showing still another access path for reading out pixel data from the block;

FIG. 11 is a table showing the number of times density changes occur in FIG. 2 when density changes are processed in accordance with the access path shown in FIG. 10;

FIG. 16 is a representation of block positions for calculating the difference between intrablock average signal levels;

FIG. 17 is a representation showing a case wherein intrablock signal levels are replaced with $P_1$ and $P_2$.

PREFERRED EMBODIMENTS OF THE INVENTION

Figure 1:
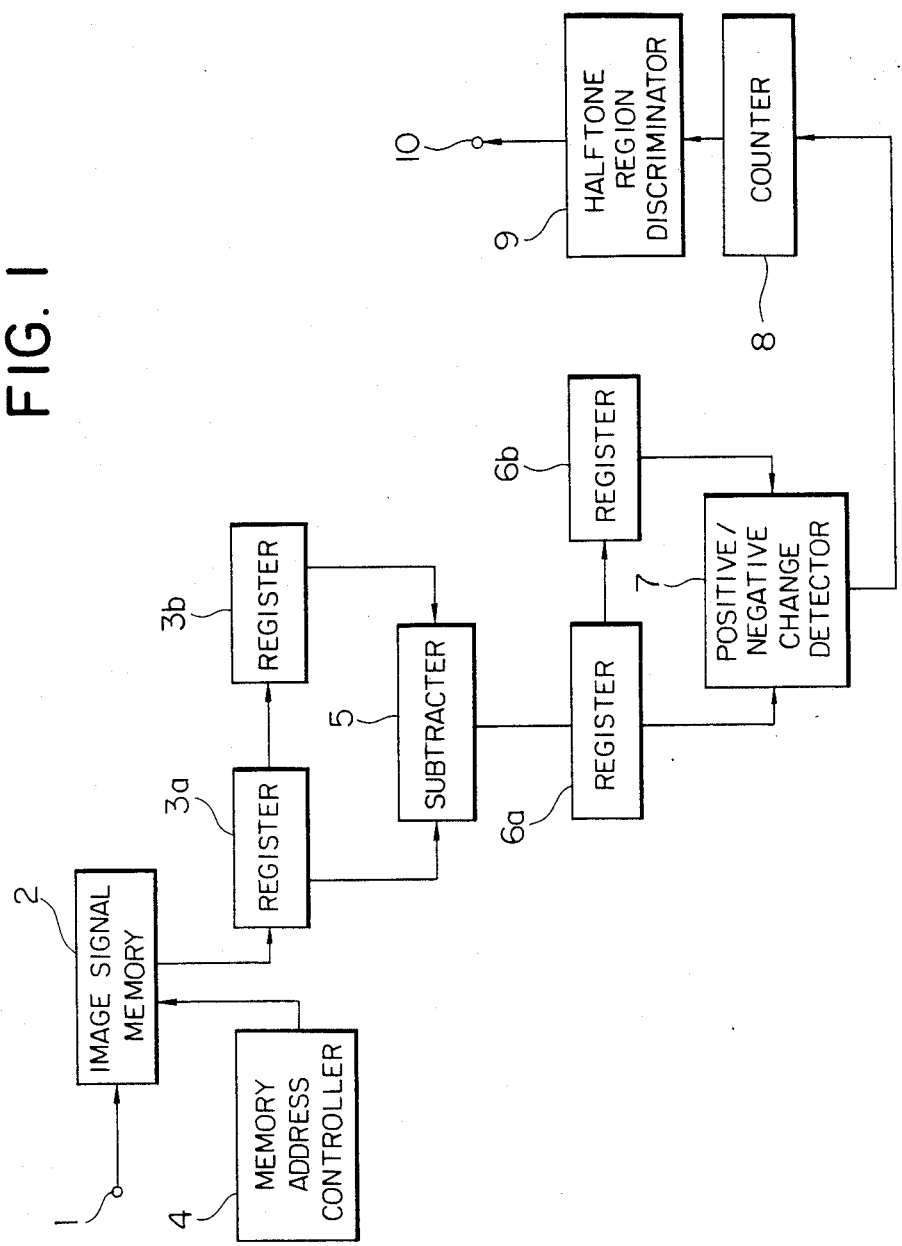
FIG. 1 is a block diagram of a halftone picture processing apparatus according to a first embodiment of the present invention.

FIG. 1 is a block diagram of a halftone picture processing apparatus according to a first embodiment of the present invention. An image signal memory 2 stores an image signal which is supplied from an input terminal 1 and which consists of a plurality of blocks. Registers 3a and 3b store one-pixel signal levels. A memory address controller 4 stores the image signals in the registers 3a and 3b in accordance with a predetermined order. The image signals in the registers 3a and 3b are then supplied to a subtracter 5. The subtracter 5 calculates differences between the image signals, and the difference signals are sequentially supplied to registers 6a and 6b. The difference signals in the registers 6a and 6b are checked by a positive/negative change detector 7 for detecting the presence/absence of positive/negative changes in the difference signals. A counter 8 is operated only when the differences stored in the registers 6a and 6b are positive and negative, or negative and positive, respectively.

When one-block processing is completed, a halftone region discriminator 9 compares a count of the counter 8 with a predetermined value. If the count is larger than the predetermined value, a signal representing that the corresponding block is a halftone region appears at an output terminal 10.

In the above description, when the level difference between two pixels is calculated, a significant signal level is identified only when the difference exceeds a predetermined value to improve the discrimination ratio without being influenced by image signal noise.

In order to perform simple processing, a comparator can be used in place of the subtracter. The comparator operates in accordance with the magnitudes of the two pixel levels. For example, when the ith pixel level is higher than the (i+1)th pixel level, logic "1" is generated. Otherwise, logic "0" is generated. When logic level updating, i.e., a change from logic "0" to logic "1" or from logic "1" to logic "0" occurs, the positive/negative change detector causes the counter to operate.

In the above description, the block is a square region of 4×4 pixels. However, a different number of pixels and block region shape may be used equally effectively.

The operation of the halftone picture processing apparatus in FIG. 1 will be described hereinafter.

Figures 2, 3, 4:
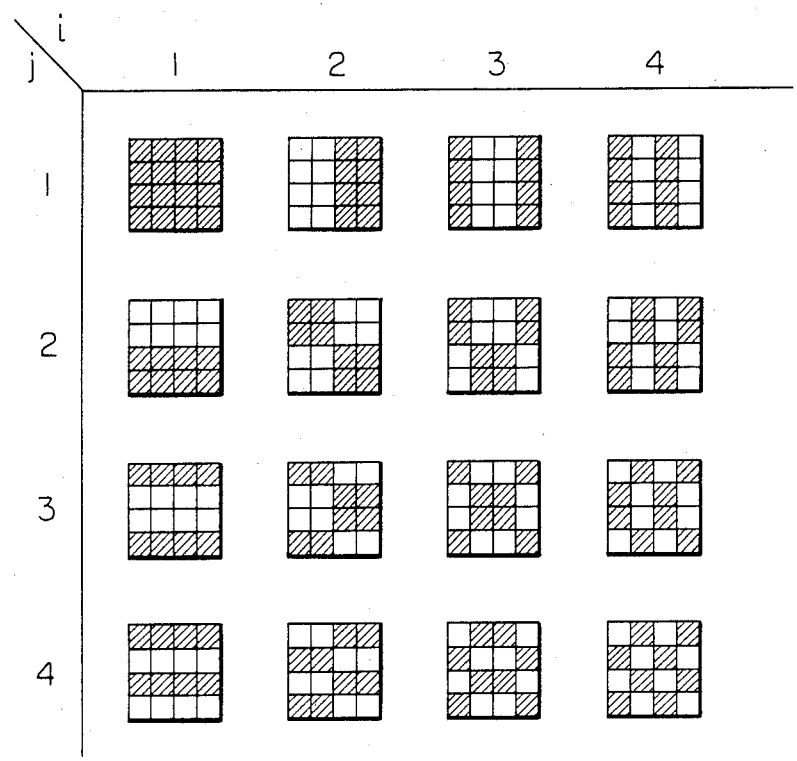
FIG. 2 is a representation for explaining an intrablock density change.
FIG. 3 is a representation showing read access order, i.e., an intrablock access path when only one access path is used.
FIG. 4 is a table showing the number of times density changes occur in FIG. 2 when density changes are processed in the order shown in FIG. 3.

FIG. 2 shows intrablock level changes when an image with a periodic density change is divided into square blocks each of which has 4×4 pixels.

Black portions (hatched portions) show pixels with a comparatively high density level, and white portions show pixels with a comparative low density level. In addition, a black-and-white inverted pattern and an inclined pattern can be included in the case of FIG. 2, but are omitted for the sake of simplicity.

The dot patterns adversely affecting coding as described with the prior arts patterns (i,j) in FIG. 2 in which i and j have large values. However, patterns (1,3), (3,1), (1,4) and (4,1) tend to occur often and must be distinguished from halftone patterns.

FIG. 3 shows a read access order for accessing pixels from a block for subsequent processing. Numbers in the columns represent read access order. The intrablock pixels having the density level of FIG. 2 and stored in the image signal memory 2 are accessed by the memory address controller 4 in accordance with the predetermined order shown in FIG. 3. The levels of each succeeding two pixels are stored in the registers 3a and 3b and the difference between these levels is calculated by the subtracter 5. If the lth accessed pixel level and the (l+1)th accessed pixel level are given as $L_l$ and $L_{l+1}$, respectively, a difference $D_l$ is given as $D_l = L_l - L_{l+1}$. Similarly, a level difference $D_{l+1}$ between the (l+1)th pixel and the (l+2)th pixel is given as $D_{l+1} = L_{l+1} - L_{l+2}$. A positive or negative change in the succeeding $D_k$ and $D_{k+1}$ from the registers 6a and 6b from the subtracter 5 is detected by the positive/negative change detector 7. The number of changes is counted by the counter 8. In the order of FIG. 3, the larger the values of i and j in the pattern (i,j) in FIG. 2, the larger the number of changes from positive to negative and from negative to positive.

FIG. 4 shows the number of positive/negative changes in the level difference signal obtained by accessing the pixel level in the order of FIG. 3 with respect to the 16 dot patterns of FIG. 2. As is apparent from FIG. 4, no positive/negative changes occur in block (1,1), while 14 positive/negative changes occur in block (4,4). The density distribution complexity in the block can be detected in accordance with the number of level changes.

Referring to FIG. 2, for example, in order to discriminate the four density distribution blocks (3,3), (3,4), (4,3) and (4,4) as halftone regions, a threshold value for the number of changes from positive to negative or negative to positive is given as 10 in FIG. 4. These blocks can be discriminated from other blocks in accordance with the threshold value. When the count generated by the counter 8 representing the number of positive/negative changes is 10 or more, the halftone region discriminator 9 generates a signal at an output terminal 10 that represents a halftone region.

In addition, when any pixel order access other than that in FIG. 3 is used, the number of positive/negative changes corresponding to FIG. 4 is changed. Therefore, the types of density distribution patterns to be detected can be changed.

FIG. 5 shows another read access order, and FIG. 6 shows the number of changes in the level difference signal from positive to negative or from negative to positive.

In the case of FIG. 5, if a threshold value of 10 is given, blocks (2,3), (3,3), (4,3), (2,4), (3,4) and (4,4) are discriminated as halftone regions.

When a conventional coding scheme is adapted without performing the halftone discrimination described above, the intrablock pixels are divided into pixels with a density higher than an average density level and pixels with a density lower than that. When logic "1" (pixel data) is assigned to pixels of higher density and logic "0" to pixels of lower density, a pattern given by block (i,j) in FIG. 2 having large values of i and j is produced as pixel data, wherein black is logic "1" and white is logic "0". Pixel data with complex changes between logic "1" and logic "0" degrades coding efficiency in normal coding schemes. This problem can be easily overcome by the present invention.

The number of changes in pixel data "1"s and "0"s is counted in accordance with the predetermined order. When the total number of changes within a block is larger than the predetermined value, this block is discriminated as a halftone region, so that the block is represented by one gradation data. Therefore, all pixel data is set to be logic "0" or "1", so that density change can be simplified and coding efficiency improved.

Counting of pixel data "1"s and "0"s can be simultaneously performed when the pixel data is produced. In other words, the pixels are accessed in accordance with the predetermined order, and each pixel is compared with the average block level to generate pixel data. At the same time, the data of the current pixel is compared with that of the immediately preceding pixel, and a change in the data is counted.

As is apparent from the above, a halftone region in the image signal can be easily detected with a simple circuit according to the present invention. The pixel access order and halftone discrimination count threshold value can be changed according to the screen frequency to be discriminated, resulting in convenience for the user.

Intrablock pixel access performed using two read access orders to detect the number of changes in signal level in accordance with these orders will be described according to a second embodiment of the present invention.

Figure 7:
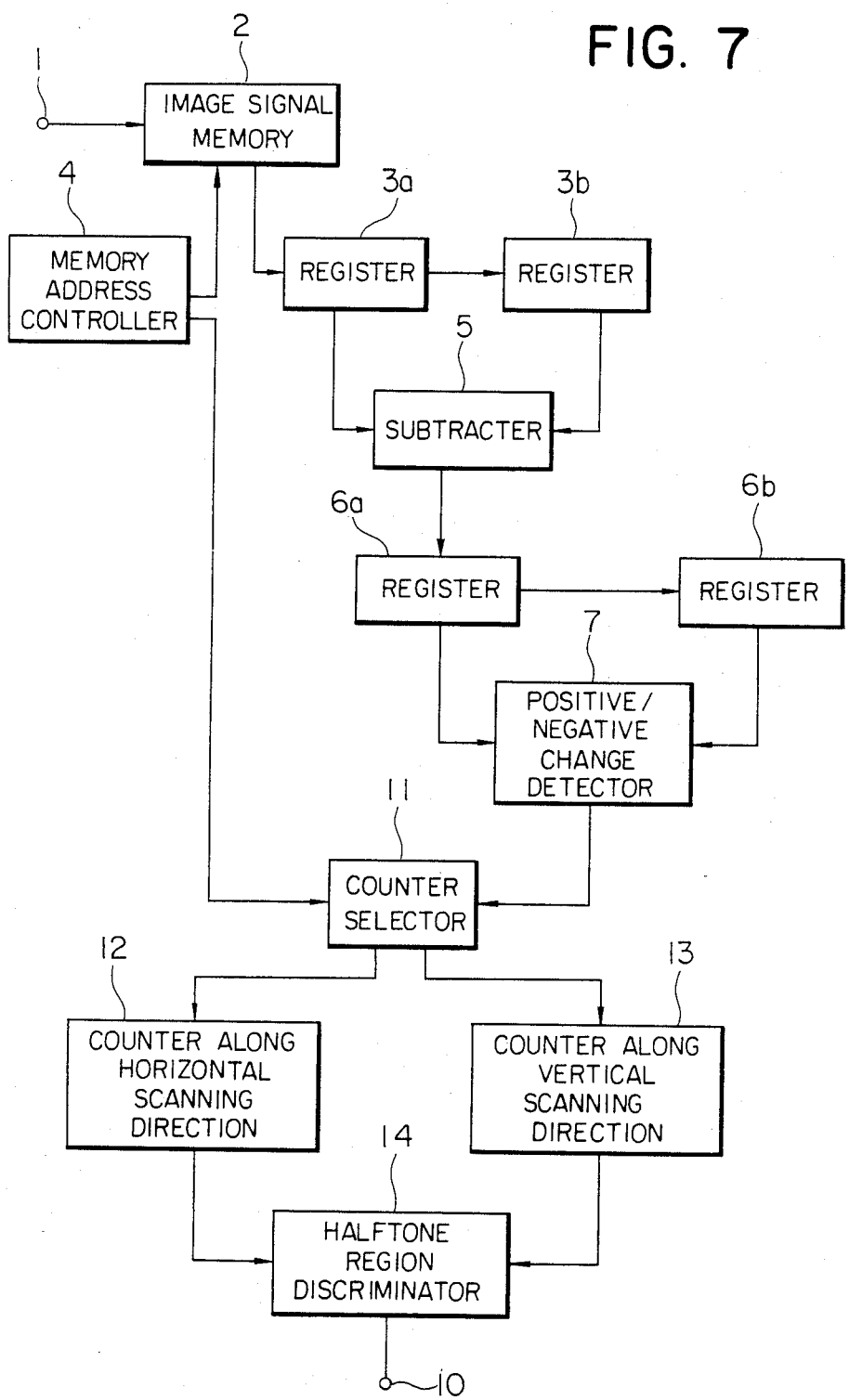
FIG. 7 is a block diagram of a halftone picture processing apparatus according to a second embodiment of the present invention.

FIG. 7 is a block diagram of a halftone picture processing apparatus according to the second embodiment. The same reference numerals in FIG. 7 denote the same parts as in FIG. 1.

An image signal memory 2 stores an image signal which is supplied from an image signal input terminal 1 and which consists of one or more blocks. Registers 3a and 3b store one-pixel signal levels under the control of a memory address controller 4 in accordance with a predetermined order. The signals from the registers 3a and 3b are supplied to a subtracter 5. The subtracter 5 calculates the difference between the outputs from the registers 3a and 3b, and the differences are sequentially supplied to registers 6a and 6b. The difference signals from the registers 6a and 6 b are then supplied to a positive/negative change detector 7, so that the positive/negative changes of the difference signals can be detected. A counter selector 11 discriminates under the control of the memory address controller 4 whether a detection result from the positive/negative change detector 7 represents the horizontal or vertical scanning direction. A detection signal is supplied to either a horizontal scanning direction counter 12 or a vertical scanning direction counter 13. The counters 12 and 13 are operated only when a level change signal is supplied thereto. When one-block processing is completed, a halftone region discriminator 14 compares counts of the counters 12 and 13 with predetermined values. When the counts of the counters 12 and 13 are respectively larger than the predetermined values, a halftone region detection signal appears at an output terminal 10.

The operation of the second embodiment will be described with reference to FIGS. 8 to 11.

FIG. 8 shows horizontal and vertical scanning direction access orders of the intrablock pixels of FIG. 2. The intrablock pixels having the density level distribution of FIG. 2 and stored in the image signal memory 2 are accessed by the memory address controller 4 in accordance with the predetermined orders along the horizontal and vertical scanning directions shown in FIG. 8. Each two succeeding pixel level signals are stored in the registers 3a and 3b, and are then supplied to a subtracter 5. The subtracter 5 calculates the difference between the level signals of the two succeeding pixels.

The lth accessed pixel level and the (l+1)th accessed pixel level are given as $L_l$ and $L_{l+1}$, so that a difference $D_l$ between the lth and (l+1)th pixels is given as:

$$D_l = L_l - L_{l+1}$$

Similiary a level difference $D_{l+1}$ between the (l+1)th pixel and the (l+2)th pixel is given as:

$$D_{l+1} = L_{l+1} - L_{l+2}$$

The succeeding level differences $D_k$ and $D_{k+1}$ are stored in the registers 6a and 6b, respectively. The positive/negative detector 7 detects a change from positive to negative or from negative to positive. When a block (i,j) in FIG. 2 is large, the numbers of changes in signal levels from positive to negative or from negative to positive are large in both the horizontal and vertical scanning directions. An output from the positive/negative change detector 7 is supplied to one of the counters 12 and 13 which is selected by the counter selector 11 in accordance with the scanning direction, i.e., the horizontal scanning direction or the vertical scanning direction.

FIG. 9 shows the numbers of changes (i.e., the number of horizontal scanning changes and the number of vertical scanning changes) in level difference signals obtained by accessing the block along the horizontal and vertical scanning directions in accordance with the orders in FIG. 8 with respect to 16 block dot patterns in FIG. 2. It should be noted, however, that the number of changes in FIG. 9 does not include the number of changes from 4 to 5, 8 to 9 and 12 to 13 in the order of FIG. 8.

As is apparent from FIG. 9, no changes occur in block (1,1) along the horizontal and vertical scanning directions, while 12 changes occur in block (4,4) along the both directions. Complexity of the intrablock density distribution can be determined by counting the number of these changes. For example, in the case of FIG. 2 where blocks (2,2), (2,3), (2,4), (3,2), (3,3), (3,4), (4,2), (4,3) and (4,4) are to be detected as halftone regions, horizontal and vertical scanning threshold values for determining halftone regions are given 4 or more each. In this case, blocks having four times or more of changes in signal levels can be detected as halftone regions. When the pixel access order and the number of pixels to be accessed are changed, the numbers of changes in signal levels from positive to negative to negative to positive can be changed, thereby allowing discrimination of different screen frequencies.

FIG. 10 shows still another access order. Referring to FIG. 10, the number of signal level changes along the horizontal scanning direction from 1 to 2, 2 to 3, 3 to 4, 7 to 8, 8 to 9, 9 to 10, 12 to 13 and 14 to 15 is measured, while the number of signal level changes along the vertical scanning direction from 4 to 5, 5 to 6, 6 to 7, 10 to 11, 11 to 12, 13 to 14 and 15 to 16 are measured, the pixels within the block can be accessed only once.

FIG. 11 shows the number of signal level changes when the pixels are accessed in the order of FIG. 10. When threshold values for the numbers of changes in signal levels along the horizontal and vertical scanning directions are given as 4 each, blocks (3,2), (4,2), (3,4) and (4,4) are detected as halftone regions.

When the number of signal level changes is measured in accordance with a predetermined signal level, or a signal level difference between the succeeding pixels exceeding a predetermined value is detected, detection is hardly influenced by image signal noise. The signal level for detecting changes can be a given value for all blocks or may vary in units of blocks. For example, the signal level for detecting the change can be defined as each average block level. When the lth accessed pixel is smaller than the average level and the (l+1)th accessed pixel is larger than the average level, or when the lth accessed pixel is larger than the average level and the (l+1)th accessed pixel is smaller than that, a signal level change is detected. In this manner, when each average block level is used, the halftone region can be detected with high precision in accordance with local density differences of the original. In the above description, the block is given as a square region of 4×4 pixels. However, the number of pixels and the shape of the block region are not limited to 16 and square, respectively, but can be extended to any number of pixels and any shape of block region. Furthermore, detection of changes in signal levels is performed by parallel processing.

According to the second embodiment as described above, a gray scale signal is divided into blocks each of which has a plurality of pixels. The signal level changes of the pixels along the horizontal and vertical scanning directions within the block are detected to determine whether or not this block is a halftone region. Therefore, high-precision discrimination can be performed with a simple circuit. When the pixel access order and the access pixel number and halftone discrimination threshold value are changed, the types of dot patterns to be detected can be easily changed.

A halftone picture processing apparatus according to a third embodiment of the present invention will be described hereinafter. In the third embodiment, the halftone region discriminator in the first or second embodiment has an additional means for determining that a block is not a halftone region when the difference between maximum and minimum levels in this block is small. With this arrangement, a portion with a small average density change exemplified by a blank portion of a document area or a background portion of a continuous-tone picture will not be erroneously discriminated as a halftone portion.

Figure 12A:
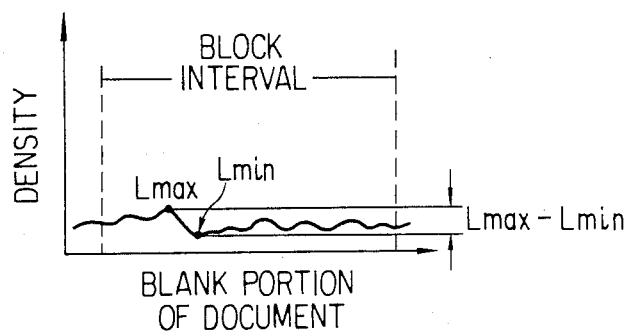
FIG. 12A is a graph showing changes in density of the blank portion of a document.
Figure 12B:
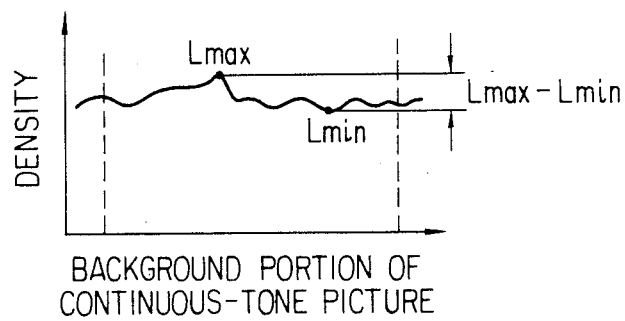
FIG. 12B is a graph showing changes in density of the background portion of a continuous-tone picture.
Figure 12C:
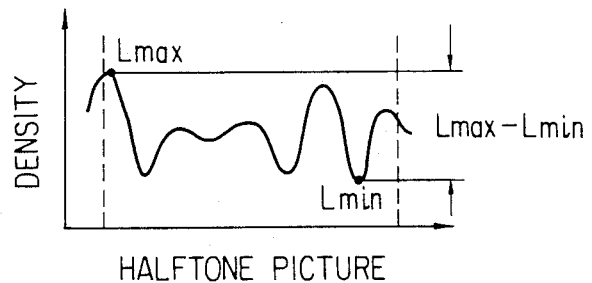
FIG. 12C is a graph showing changes in density of a halftone picture portion.

FIGS. 12A, 12B and 12C show changes in densities of a blank portion of a document, a background portion of a continuous-tone picture, and a halftone picture, respectively The block interval corresponds to the block in the first or second embodiment. The maximum and minimum density levels within the block are given as $L_{max}$ and $L_{min}$, respectively.

Figure 13:
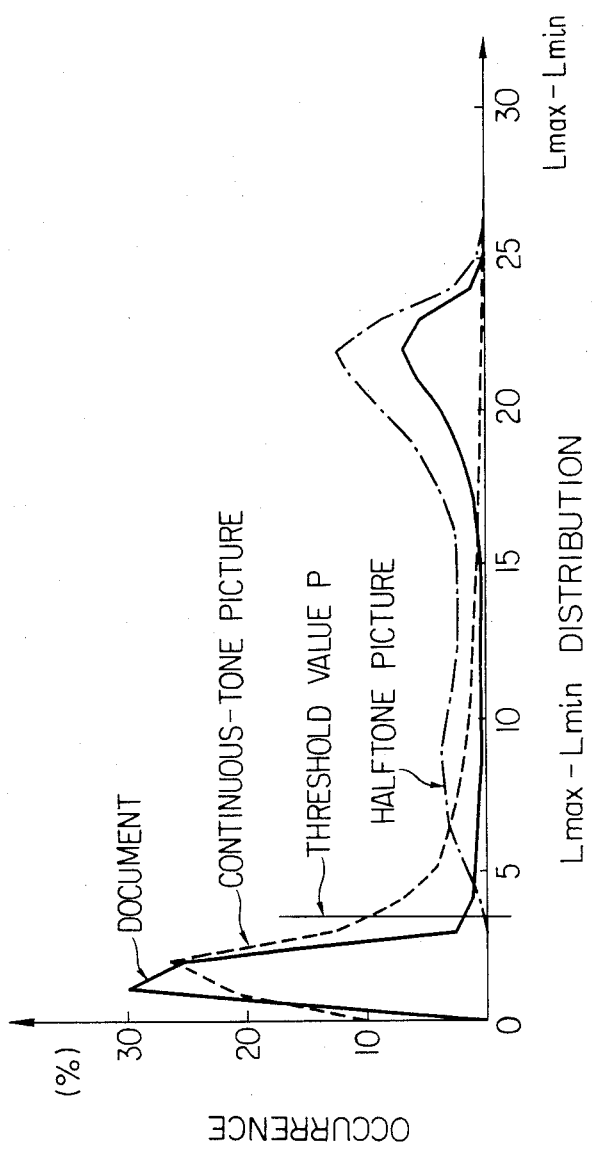
FIG. 13 is a graph showing an $L_{max} - L_{min}$ distribution of blocks in the blank portion of the document, the background portion of the continuous-tone picture, and the halftone picture portion.

The change in density at the halftone region adversely affecting coding described with reference to the prior arts is exemplified in FIG. 12C and must be distinguished from the cases in FIGS. 12A and 12B wherein signal level change is small even if the number of changes in densities is large. FIG. 13 is a graph showing the occurrence distribution of the $L_{max}-L_{min}$ characteristics in each block when the image signal data of 5 bits/pixel read at a rate of 8 dots/mm is divided into blocks each of which consists of 4×4 pixels. Peaks frequently appear at small $L_{max}-L_{min}$ values in the document and continuous-tone picture distributions. These peaks correspond to blocks for the blank of the document portion and the background portion of the continuous-tone picture. Therefore, when a threshold value P is given in FIG. 13, the $L_{max}-L_{min}$ values of the respective blocks are compared with the threshold value P. When the $L_{max}-L_{min}$ values are smaller than the threshold value P, the corresponding blocks can be excluded as those constituting the blank portion of the document portion and the background of the continuous-tone picture. Therefore, only blocks having the $L_{max}-L_{min}$ values larger than the threshold value P are subjected to discrimination of numbers of density changes to determine whether or not these blocks are halftone regions.

Figure 14:
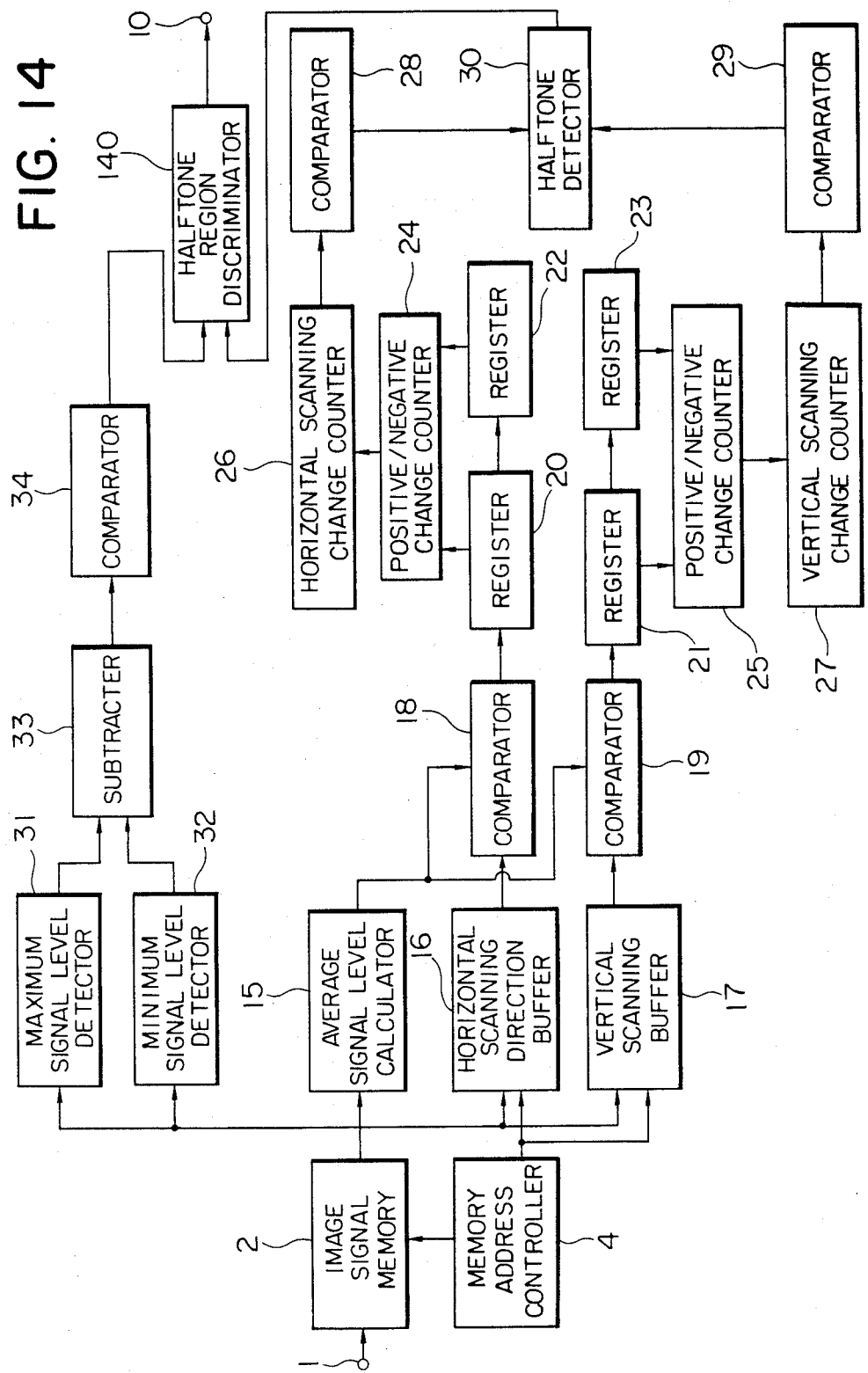
FIG. 14 is a block diagram of a halftone picture processing apparatus according to a third embodiment of the present invention.

FIG. 14 shows a halftone picture processing apparatus according to a third embodiment of the present invention. An image signal memory 2 stores an image signal which is supplied from an image signal input terminal 1 and which consists of one or a plurality of blocks. An average value calculator 15 calculates an average intrablock signal level. Image signal buffers 16 and 17 store image signals in accordance with the pixel order for measuring horizontal and vertical scanning changes. Comparators 18 and 19 compare the average signal level calculated by the average signal level calculator 15 with image signal levels sequentially supplied from the image signal buffers 16 and 17. Registers 20, 21, 22 and 23 temporarily store the comparison results from the comparators 18 and 19. Positive/negative change detectors 24 and 25 detect whether or not a positive/negative change inversion occurs between the two succeeding pixels in accordance with the positive/negative comparison results of the respective image signals and the average signal levels stored in the registers 20 and 22, and 21 and 24. The detection results from the positive/negative change detectors 24 and 25 are supplied to change counters 26 and 27. The change counters 26 and 27 are operated only when a positive/negative change occurs. When one-block positive/negative comparison detection is performed, the comparators 28 and 29 compare predetermined threshold values with the horizontal and vertical scanning change times calculated by the change counters 26 and 27. When the comparison results from the comparators 28 and 29 ar larger than predetermined threshold values, a halftone detector 30 detects that the corresponding block is a halftone region or the like where the number of density changes is large. Maximum and minimum value detectors 31 and 32 calculate an intrablock maximum signal level $L_{max}$ and an intrablock minimum signal level $L_{min}$, respectively. A subtracter 33 calculates a difference $L_{max}-L_{min}$ between the maximum and minimum signal levels calculated by the maximum and minimum signal level detectors 31 and 32. A comparator 34 compares the difference $L_{max}-L_{min}$ with the predetermined threshold value P. A halftone region discriminator 140 discriminates in accordance with the detection result of the halftone detector 30 whether or not the corresponding block is a halftone region when the difference $L_{max}-L_{min}$ is detected by the comparator 34 to be larger than the threshold value P. Otherwise, the halftone region discriminator 140 discriminates that the corresponding block is not a halftone region. A discrimination result of the halftone region discriminator 140 appears at a discrimination result output terminal 10.

According to this embodiment as described above, erroneous discrimination at a blank portion of a document or a background portion of a continuous-tone picture is minimized. In addition, occurrence of erroneous discrimination of a halftone picture portion is not increased, thereby effectively detecting a halftone region.

Figure 15:
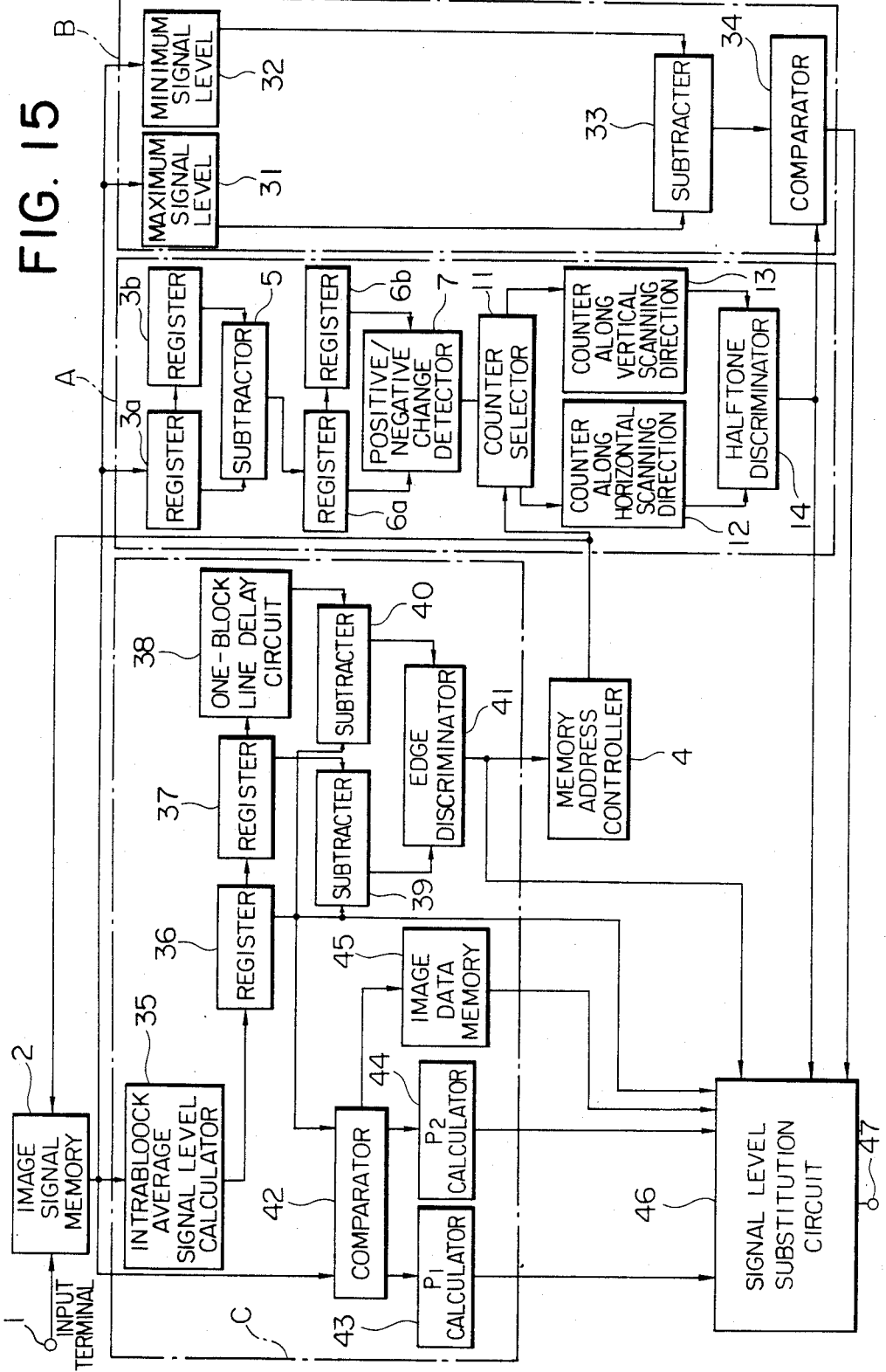
FIG. 15 is a block diagram of a halftone picture processing apparatus according to a fourth embodiment of the present invention.

A halftone picture processing apparatus according to a fourth embodiment of the present invention will be described hereinafter. As shown in FIG. 15, the apparatus comprises: a halftone region discrimination section A for discriminating whether or not a block is a halftone region in accordance with changes in succeeding pixel signals along intrablock horizontal scanning and vertical scanning paths; a discrimination correction section B for discriminating that the block is not a halftone region irrespective of the discrimination of the halftone region discrimination section A when the difference between maximum and minimum signal levels of the intrablock pixel signals is smaller than a predetermined threshold value; an edge processing section C for detecting the block is an edge portion of the image and processing the block; and a signal level substitution section 46. The halftone region discrimination section A is substantially the same as that described with reference to the second embodiment (FIG. 7), and the same reference numerals in FIG. 15 denote parts of the same functions as in FIG. 7. The discrimination correction section B is substantially the same as that described in the third embodiment in FIG. 14, and the same reference numerals in FIG. 15 denote the same parts as in FIG. 14.

FIG. 16 shows block positions for calculating an average signal level difference between adjacent blocks so as to discriminate edges of halftone regions and continuous-tone portions. Reference symbols $P_0$, $P_A$ and $P_B$ denote the average signal levels of the respective blocks. When an absolute value $|P_0-P_A|$ or $|P_0-P_B|$ exceeds a predetermined value, the block having $P_0$ as the average signal level is discriminated as an edge portion. For example, an edge discrimination threshold value is given as 4, conditions $|P_0-P_A|=|6-12|\geq 4$. In the case of FIG. 15, the block with the value $P_0$ is discriminated as an edge. The block discriminated as the edge is divided into pixels with levels smaller than the average signal level $P_0$ and pixels with levels larger than that. The average signal level $P_1$ of the pixels with higher levels and the average signal level $P_2$ of the pixels with lower levels are calculated. The signal levels of the pixels within the same groups are substituted by $P_1$ and $P_2$, respectively. With this processing, the edge is determined reliably. The screen pattern can be eliminated from the edge of a halftone picture. The edge discrimination and the calculations of the average signal levels $P_1$ and $P_2$ are performed by the edge processing section C in FIG. 15. The portion for discriminating whether or not a block is an edge comprises an intrablock average signal level calculator 35 for calculating an intrablock average signal level using pixel signals of each block which are sequentially read out from the image signal memory 2; registers 36 and 37 and a one-block line delay circuit 38 for storing the average signal levels $P_0$, $P_A$ and $P_B$ of three adjacent blocks which are sequentially calculated by the intrablock average signal level calculator 35; a subtracter 39 for calculating an absolute value $|P_0-P_A|$; a subtracter 40 for calculating an absolute value $|P_0-P_B|$; and an edge discriminator 41 for comparing a predetermined threshold value with outputs from the subtracters 39 and 40 and for discriminating the block with the average signal level $P_0$ as an edge when one of the outputs from the subtracters 39 and 40 exceeds the predetermined threshold value. When the edge discriminator 41 discriminates that a block is an edge, pixel signals of this block are sequentially read out from the image signal memory 2. The pixel signal levels are sequentially compared by a comparator 42 with the average signal level $P_0$. The pixel signals with levels lower than the average signal level $P_0$ are supplied to a $P_1$ calculator 43, and the pixel signals with levels higher than the average signal level $P_0$ are supplied to a $P_2$ calculator 44. The $P_1$ calculator 43 calculates an average signal level of the image signal group the level of which is lower than the average signal level. Similarly, the $P_2$ calculator 44 calculates an average signal level of image signal group the level of which is higher than the average signal level. The $P_1$ and $P_2$ average signal levels are supplied to a signal level substitution circuit 46. A pixel data memory 45 stores data representing which pixels are included in $P_1$ and $P_2$ average signal level groups. The signal level substitution circuit 46 substitutes the pixel signal levels of the respective groups within the block with $P_1$ and $P_2$ in accordance with the data from the image data memory 45.

When the edge discriminator 41 discriminates that the block does not represent an edge, this block is checked by the halftone region discrimination section A to determine whether or not the block is a halftone region. The operation of the halftone region discrimination section A is substantially the same as the corresponding portion described with reference to FIG. 7, and a detailed description thereof will be omitted.

However, when the block is discriminated to be a halftone region, the signal level substitution circuit 46 substitutes all the pixel signals within this block with the average signal level $P_0$, thereby eliminating the screen pattern. The screen pattern may be eliminated by another known technique. For example, each block is divided into subblocks, an average signal level of the pixel signals is calculated in units of subblocks, and this average signal level is used for substitution. According to still another technique, each block is divided into subblocks of a 3×3 pixel matrix, and the value of the central pixel in each subblock is substituted by the average value of the subblock, thereby eliminating the screen pattern.

When the block is discriminated not to be a halftone region, the intrablock maximum and minimum signal levels $L_{max}$ and $L_{min}$ are calculated by the maximum and minimum signal level detectors 31 and 32, respectively. A difference $L_{max}-L_{min}$ is calculated by a subtracter 33. The difference $L_{max}-L_{min}$ is compared by a comparator 34 with a predetermined value. When the difference $L_{max}-L_{min}$ is larger than the predetermined value, the block is discriminated as a character portion. In a signal level substitution circuit 46, pixels in the block are substituted with $P_1$ and $P_2$ in the same manner as in edge discrimination. For example, if a threshold value for a gradation difference is given as 100 for the block having the signal levels in FIG. 17, when this block has $L_{max}=140$ and $L_{min}=30$, then $L_{max}-L_{min}=110\geqq100$. $P=40$ is established for pixels with $P_0=80$ or less. Four pixels with levels larger than $P_0$, the levels are substitute by $P_2=120$, thus obtaining transform processing in FIG. 17.

However, if the difference $L_{max}-L_{min}$ is smaller than the predetermined value, the block represents a blank portion of a document or a background portion of the continuous-tone picture. Thus, the pixels are generated without substitution.

According to the fourth embodiment described above, the gray scale facsimile signal including a halftone picture can be converted to a signal suitable for coding without impairing precision by simple processing.

In the above description, the block is a square region of 4×4 pixels. However, the number of pixels and the shape of the block region may vary. In the halftone discrimination section, the pixel level is compared with the predetermined signal level in the same manner as in the third embodiment in FIG. 14, thereby detecting the image signal levels and hence substantially eliminating the image signal influence. The signal levels for detecting the changes can be given as a common value for all blocks or may vary in units of blocks. For example, the signal levels for detecting the changes can be the average levels of the respective blocks. In this case, halftone regions can be discriminated with high precision in accordance with local density differences. In the above description, blocks with small signal level differences are not subjected to substitution. In blocks having large signal level differences, the signal levels are substituted by the average signal level $P_1$ for the group of pixels with levels smaller than the average signal level, and the signal levels by the average signal level $P_2$ for the group of pixels with levels larger than the average signal level. However, substitution can be performed by using other signal levels. In addition, the number of signal levels to be substituted can vary.

When the signal levels are substituted by using $P_0$, $P_1$ and $P_2$, pixels substituted by $P_0$ and $P_1$ are assigned with logic "0", and pixels substituted by $P_2$ are assigned with logic "1". In this case, the facsimile signal can be classified as resolution data of logic "0" and logic "1" which represent the gradation data of $P_0$, $P_1$ and $P_2$ and the correspondence between the pixels and $P_0$, $P_1$ and $P_2$. The gradation data and the resolution data are independently coded to effectively transmit the facsimile signal.

In order to further improve coding efficiency, if the number of pixels substituted by $P_1$ and the number of pixels substituted by $P_2$ in the block are smaller than the predetermined value, the corresponding block can be substituted by $P_0$. Alternatively, when $P_0$ of a block supposed to be substituted by $P_1$ and $P_2$ is very small or large in a range of $P_0$, pixels of the block can be substituted by $P_0$.

In the above embodiment, substitution processing is performed for all cases. However, substitution processing may be performed to eliminate the screen pattern for a halftone region, and block signals in other edge and character portions can be used without substitution processing.

In the above embodiment, edge discrimination using interblock average level differences, halftone region discrimination using the number of changes in access path, and character discrimination using the difference between the maximum and minimum values of the intrablock signal levels are performed in the order named. However the order of these discrimination operations can be reordered or parallel performed.

Figure 18:
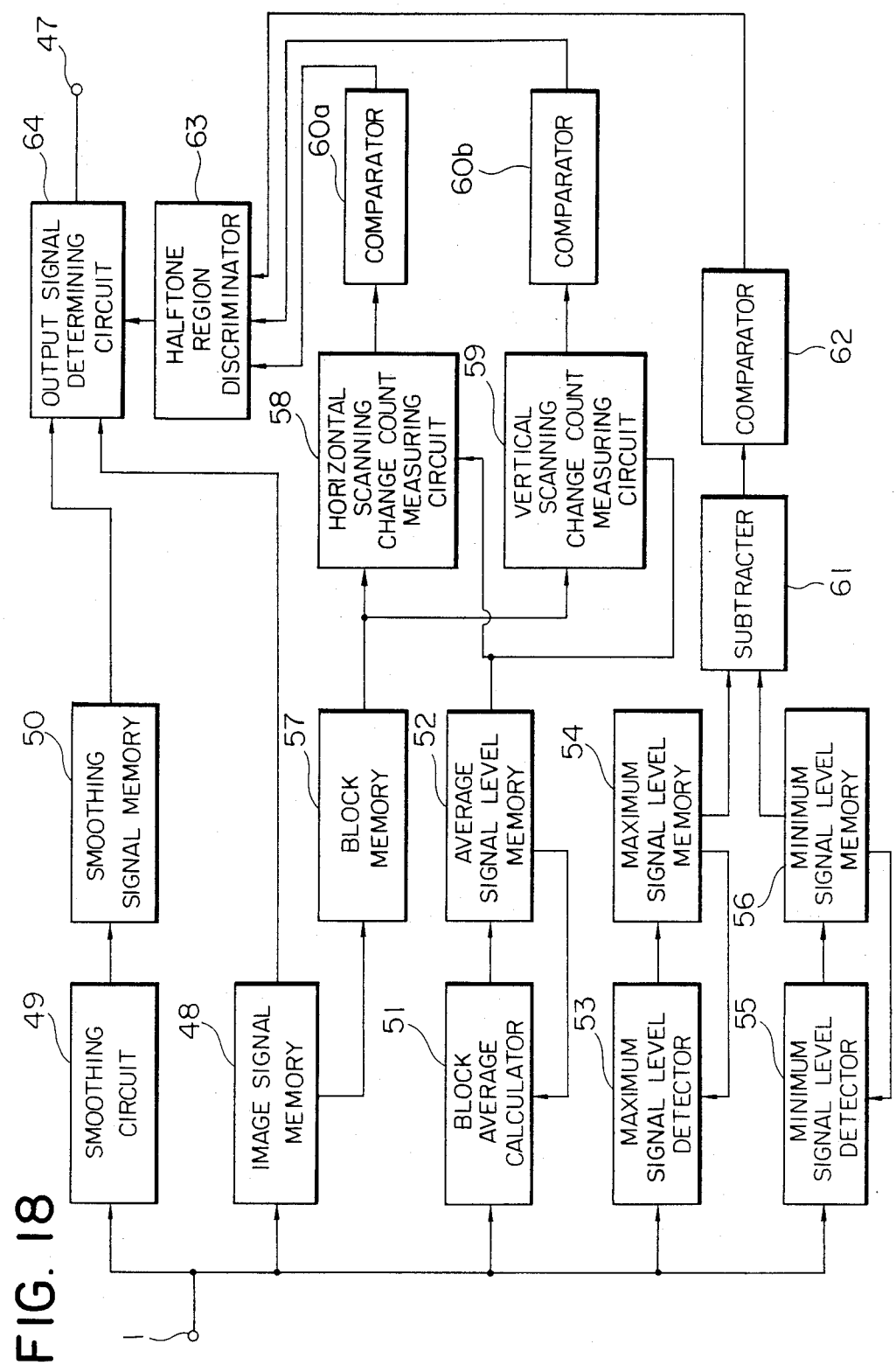
FIG. 18 is a block diagram of a halftone picture processing apparatus according to a fifth embodiment of the present invention.

FIG. 18 shows a halftone picture processing apparatus according to a fifth embodiment of the present invention.

An image signal supplied from an image signal input terminal 1 is stored in a image signal memory 48 with a plurality of line memories. At the same time, the input image signal is supplied to a smoothing circuit 48 which calculates a smoothing signal derived from an average signal level of a 3×3 pixel matrix. The smoothing signal is stored in a smoothing signal memory 50. Furthermore, the image signal supplied to a block average signal level calculator 51 adds every four pixel signals. The output from the average signal level calculator 51 is added to the memory content of the corresponding block in an average signal level memory 52, and the sum is stored in the average signal level memory 52 again. After a 4-line image signal is supplied to the apparatus, a sum of 4×4 pixel signals is stored in the average signal level memory 52. At the same time, a maximum signal level detector 53 calculates a maximum signal level for every four pixels. The calculated maximum signal level is compared with the memory content of a maximum signal level memory 54 for the corresponding block. The content of the maximum signal level memory 54 is substituted by a larger one of the compared signal levels. A minimum signal level detector 55 calculates a minimum signal level for every four pixels. The calculated minimum signal level is compared with the signal level of the corresponding block in a minimum signal level memory 56. The current content of the minimum signal level memory 56 is updated to a smaller one of the compared signal levels. After a 4-line input is performed, the maximum and minimum signal levels of the 4×4 pixel block are stored in the maximum and minimum signal level memories 54 and 56. These signal levels are cleared every time new four lines are processed. A block memory 57 stores one or a plurality of image signals. A horizontal scanning direction change counter 58 calculates an average signal level of the corresponding block in accordance with the content of the average signal level memory 52 which corresponds to the block in the block memory 57. The counter 58 calculates the number of changes in image signals to signal levels larger or smaller than the average signal level between the continuous pixels along the predetermined horizontal scanning direction. Similarly, a vertical scanning direction change counter 59 uses the signal level of the average signal level memory 52 and calculates the number of changes in the image signals to signal levels larger or smaller than the average signal level between the succeeding pixels along the predetermined vertical scanning direction. The change number signals calculated by the change counters 58 and 59 are compared by comparators 60a and 60b with predetermined signal levels. The comparators 60a and 60b generate difference signals, respectively. A subtracter 61 calculates the difference between the maximum and minimum signal levels calculated by the maximum and minimum signal level calculators 54 and 56. A comparator 62 compares a predetermined signal level with the maximum and minimum signal levels and generate difference signals. A halftone region discriminator 63 discriminates that the block is not a halftone region when the difference signal from the comparator 62 is small. However, when the difference signal from the comparator 62 is large and both the outputs from the comparators 60a and 60b are large, the corresponding block is discriminated as a halftone region. In all other cases, the block is discriminated not to be a halftone region. The corresponding discrimination signal is generated. An output signal determining circuit 64 reads out the smoothing signal from the smoothing signal memory 50 for the pixel corresponding to the block which is discriminated as the halftone region. The output signal determining circuit 64 reads out the image signal from the image signal memory 48 for the block which is discriminated not to be a halftone region. The output signal from the circuit 64 appears at a processed signal output terminal 47. In this embodiment, sequential processing can be easily performed. The signal corresponding to only a halftone region is smoothed, and signals corresponding to other portions are not smoothed, thereby preventing degradation in image quality.

What is claimed is:

1. A halftone picture processing apparatus for scanning an original that may contain a halftone picture, obtaining a gray scale image signal, dividing the gray scale image signal into blocks each of which has a plurality of pixels, and processing said blocks, said apparatus comprising:
    means for storing blocks each of which has a plurality of pixels;
    means for sequentially reading out pixel signals in units of blocks in accordance with at least one predetermined access path for detecting a distribution complexity in the blocks;
    change count detecting means for detecting a change in signal level between succeeding pixel signals read out along said access path and counting the number of times there are changes in signal levels; and
    means for discriminating in accordance with the number of changes which occur whether or not a block corresponding to the change in signal level is a halftone region.

2. An apparatus according to claim 1, wherein said access path comprises one path.

3. An apparatus according to claim 2, wherein said halftone region discriminating means comprises means for comparing a predetermined value with the number of changes in signal levels along the access path, said comparing means being adapted to generate a signal representing that a corresponding block is a halftone region when the number of changes esceeds the predetermined value.

4. An apparatus according to claim 1, wherein said access path comprises first and second access paths, said first access path being a horizontal scanning direction path in blocks arranged along a horizontal scanning direction, said second access path being a vertical scanning direction path in the blocks.

5. An appatatus according to claim 4, wherein said halftone region discriminating means comprises comparing means for comparing the numbers of changes, respectively, with predetermined values in the first and second access paths, said comparing means being adapted to generate a signal representing that a 6. An apparatus according to claim 1, wherein said change count detecting means comprises means for sequentially calculating signal level differences between the succeeding pixel signals, and means for counting the number of changes in calculated signal level differences from positive to negative or from negative to positive.

7. An apparatus according to claim 1, wherein said change count detecting means comprises means for discriminating whether or not each pixel signal has a level higher than a predetermined signal level, and means for counting the number of changes between the succeeding pixel signals in said access path.

8. An apparatus according to claim 7, wherein the predetermined signal level is a specific signal level derived from the image signal.

9. An apparatus according to claim 8, wherein said change count detecting means comprises means for calculating an average signal level of each block, said specific image signal being adapted to derive a calculated average signal level.

10. An apparatus according to claim 1, wherein said change count detecting means comprises detecting means having means for sequentially calculating differences between signal levels of the succeeding pixel signals, means for detecting as significant signal levels only differences among the calculated signal level differences which are larger than a predetermined value, and means for counting the number of positive and negative changes between the succeeding pixel signals along the access path.

11. An apparatus according to claim 1, wherein said change count detecting means comprises means for calculating a difference between each pixel signal and a predetermined signal level, means for detecting as significant signal levels only differences among the calculated signal level differences which are larger than the predetermined signal level, and means for counting the number of positive and negative changes between the succeeding pixel signals along the access path. corresponding block is a halftone region when the numbers of changes are respectively larger than the predetermined values.

12. An apparatus according to claim 1, further comprising means for calculating a difference between a maximum signal level and a minimum signal level of the pixels in the block, and comparing means for comparing the difference with a predetermined value and generating a signal representing that the difference between the maximum and minimum signal levels is larger than the predetermined value.

13. An apparatus according to claim 12, wherein the signal from said comparing means represents that the block is not a halftone region when the difference between the maximum and minimum signal levels is smaller than the predetermined value.

14. An apparatus according to claim 13, wherein said halftone region discriminating means does not perform halftone region discrimination when the signal from said comparing means represents that the block is not a halftone region.

15. An apparatus according to claim 12, further comprising edge processing means for substituting the signal level of the pixels in the block with several levels with large differences therebetween in response to the signal which represents that the difference between the maximum and minimum signal levels exceeds the predetermined value and which is generated by said comparing means and a discrimination output which represents that the block is not a halftone region and which is generated by said halftone region discriminating means.

16. An apparatus according to claim 1, further comprising means for calculating an intrablock average signal level of each block; means for calculating a difference between interblock average signals of adjacent blocks; edge discriminating means for comparing the difference with a predetermined value and discriminating that a corresponding block is an edge when the difference is larger than the predetermined value; and edge processing means for substituting the pixels of the corresponding block with several signal levels with large differences.

17. An apparatus according to claim 12, further comprising means for eliminating a screen pattern of the block discriminated as a halftone region.

18. An apparatus according to claim 1, further comprising means for eliminating a screen pattern of the block discriminated as a halftone region.

19. An apparatus according to claim 18, wherein said screen pattern eliminating means is arranged to substitute the pixels of the block discriminated as a halftone region with several levels for decreasing signal level differences between the adjacent pixels.

20. An apparatus according to claims 1, further comprising means for calculating an intrablock average signal level of each block; means for calculating a difference between interblock average signals of adjacent blocks; edge discriminating means for comparing the difference with a predetermined value and discriminating that a corresponding block is an edge when the difference is larger than the predetermined value; and edge processing means for substituting the pixels of the corresponding block with several signal levels with large differences therebetween.

21. An apparatus according to claim 20, wherein said edge processing means comprises means for comparing the intrablock average signal level with the signal level of each pixel of the corresponding block and classifying the pixels into a group of pixels with signal levels larger than the intrablock signal level and a group of pixels with average signal levels smaller than the intrablock average signal level; means for calculating average signal levels of the groups of pixels; and means for substituting the levels of the pixel signals of the groups with the corresponding group average signal levels.

22. An apparatus according to claim 20, wherein the halftone discrimination is omitted when said edge discriminating means discriminates that the corresponding block is an edge.

* * * * *